United States Patent Office 3,426,793
Patented Feb. 11, 1969

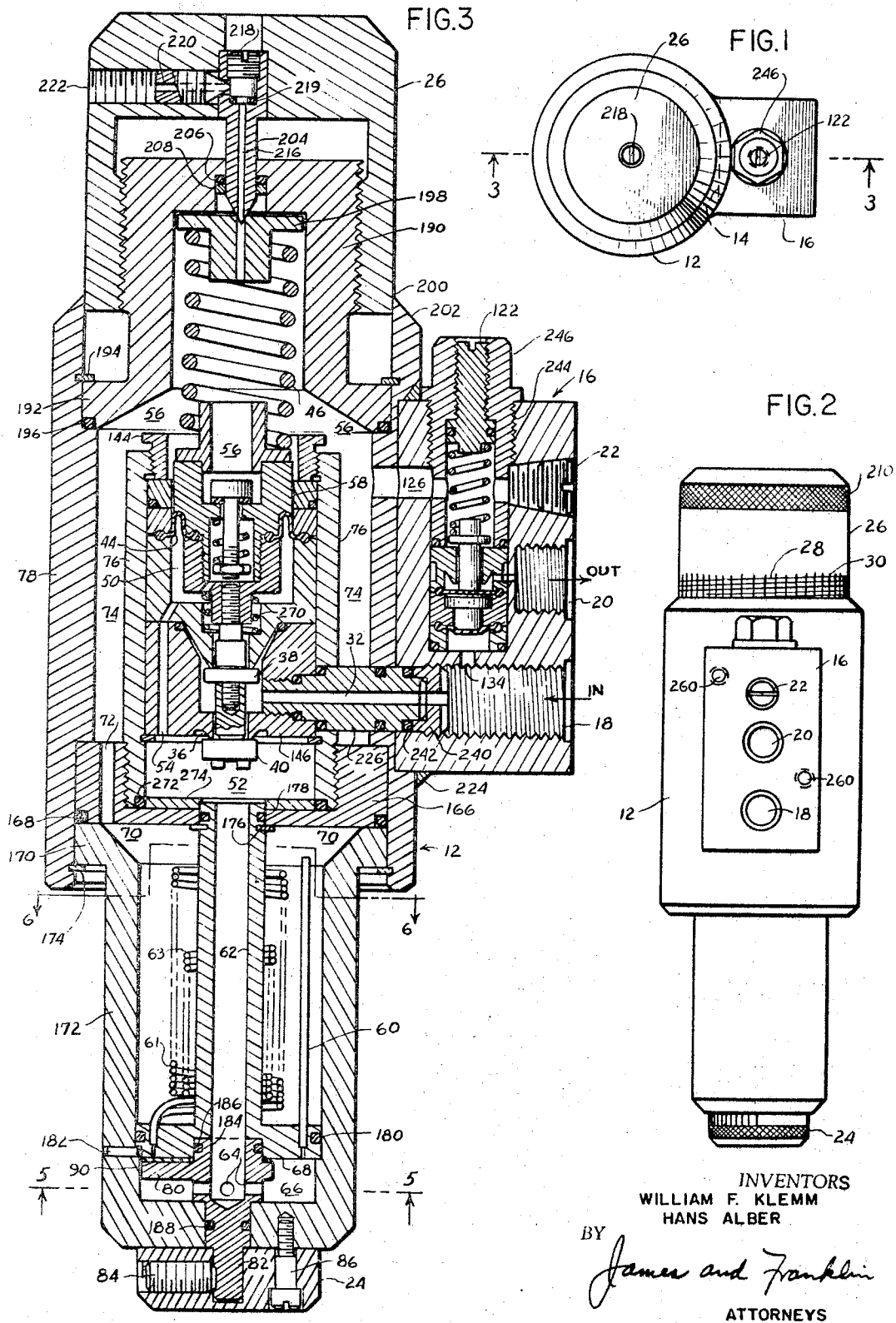

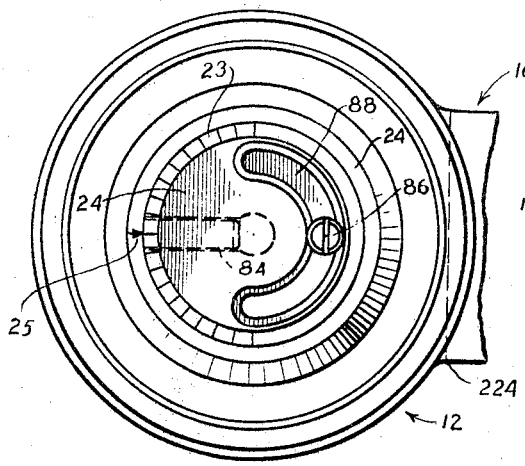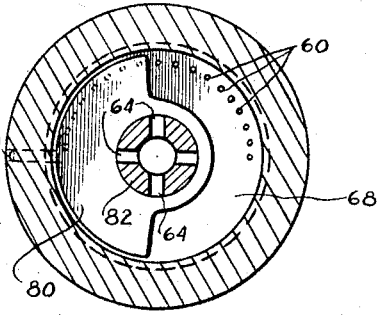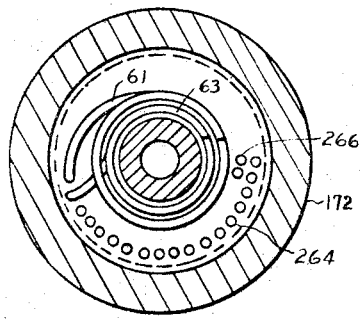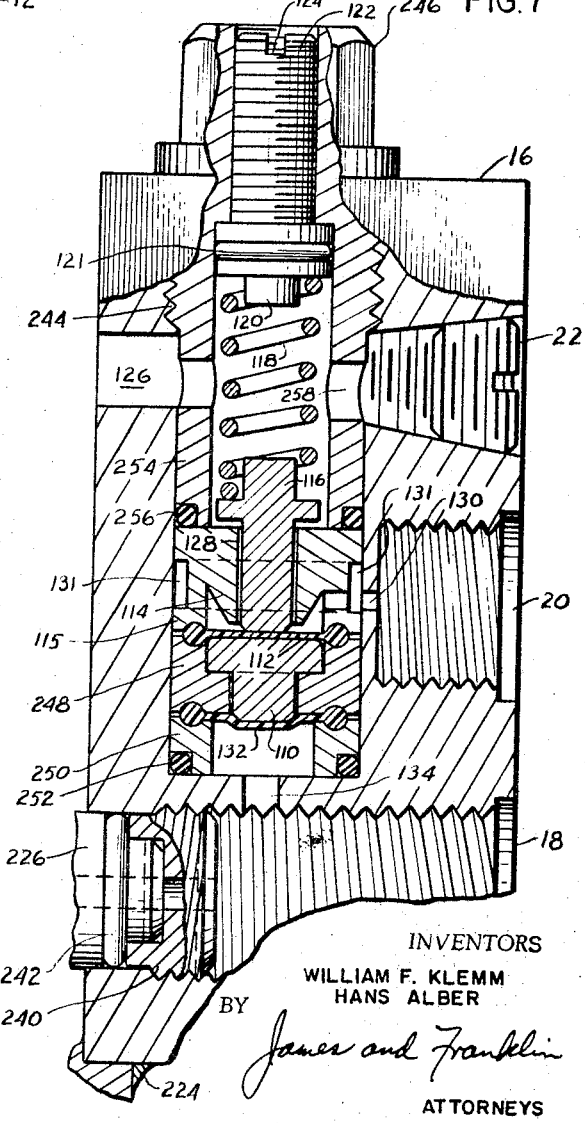

3,426,793
BALANCED CONTROL FOR METERED FLOW WITH SERIALLY ARRANGED PRESSURE REGULATING VALVE AND RESTRICTOR TUBES
William F. Klemm, Nutley, and Hans Alber, Mountainside, N.J., assignors of one-third to Henry B. Peter, Union, N.J.
Filed Dec. 20, 1965, Ser. No. 514,809
U.S. Cl. 137—599          10 Claims
Int. Cl. F16k 47/12; G05d 16/02, 16/06

ABSTRACT OF THE DISCLOSURE

For adjustable slow flow a friction tube is used which is large enough in bore to avoid clogging, and long enough to produce the desired slow flow. The flow is accurately regulated by adjusting a pressure regulator ahead of the restrictor tube. The regulator is balanced to accommodate wide variations in supply pressure. The restrictor comprises a cluster of collateral restrictor tubes, all terminating at one end of a flat circular header. A rotatable sector valve is slidable on the header and is moved by a control knob for making effective desired ones of the restrictor tubes, while blocking the others. The diaphragm assembly has a safety valve which opens under excessive pressure which might injure the diaphragm.

---

The primary object of the invention is to generally ticularly to adjustable flow controls to accurately regulate the flow of a fluid.

The primary object of the invention is to generally improve the adjustable flow controls disclosed in our prior applications Ser. No. 355,997, filed Mar. 27, 1964 and entitled "Adjustable Flow Control for Metered Flow of Fluid," since issued on June 6, 1967 as U.S. Patent No. 3,323,535, and Ser. No. 396,527, filed Sept. 15, 1964, and entitled, "Adjustable Control for Metered Flow," since issued on Aug. 15, 1967 as U.S. Patent No. 3,335,748. In said prior applications we explain that a needle valve or equivalent constriction is readily clogged by small dirt particles. This and other disadvantages were overcome by using a friction tube of large enough bore to avoid clogging, and long enough to produce a desired pressure drop and slow flow. This tube was preceded by a manually adjustable pressure regulator, to accurately adjust the rate of flow.

Our prior controls included a preliminary pressure regulator preceding the adjustable pressure regulator, in order to reduce the supply pressure to a uniform desired working pressure. This was considered necessary in order to overcome possible loss of accuracy caused by wide variations in the supply pressure. One object of the present invention is to eliminate the need for the preliminary pressure regulator, and more specifically to provide a balanced pressure regulator with two seats and two valves on a common valve stem, the high pressure inlet being connected to the region between the two valves, so that the regulator becomes a symmetrical or balanced structure.

In our prior application Ser. No. 396,527 we explained that if the adjustment is to be over a wide range of flow rate, a plurality of different restrictors may be provided, with a shut off valve for each, thereby making it possible to use one or another of several restrictors. A further object of the present invention is to simplify the structure needed for such wide range adjustment, which is done by providing a cluster of restrictors ending in a flat header, with a single valve plate slidable over the header to open some while closing the remainder of the restrictors.

The balanced pressure regulator is actuated by a pressure diaphragm working in opposition to an adjustable compression spring, and the diaphragm may be subjected to a pressure which may increase beyond desirable limits, and another object of the present invention is to protect the diaphragm against excessive pressure, which is done by providing a safety valve in the diaphragm, which valve opens at a desired limiting pressure and so bypasses the diaphragm.

The present class of flow control is particularly useful for controlling the rate of movement of an actuator energized by fluid leaving the flow control. The device is important for low rates of flow intended to move the actuator or machine part very slowly, but in that case it may take an undesirably long time to build up the pressure needed to start movement of the actuator or machine. Still another object of the present improvement is to help overcome this difficulty, and more specifically to maintain a desired back pressure in the regulator. This is done by providing a back pressure valve which closes when differentiated between the back pressure at the flow control outlet and the inlet pressure falls below a desired value, thereby maintaining the desired pressure value in the body of the flow control itself.

A further object is to provide an improved, compact, and simplified structure for the adjustable flow control.

To accomplish the foregoing objects, and other objects which will hereinafter appear, our invention resides in the adjustable flow control elements and their relation one to another, as are hereinafter more particularly described in the following specification. The specification is accompanied by drawings in which:

FIG. 1 is a plan view of a flow control unit embodying features of our invention;

FIG. 2 is an elevation looking toward the mounting block;

FIG. 3 is a vertical section taken approximately on the line 3—3 of FIG. 1;

FIG. 4 is a bottom view of the restrictor selector knob;

FIG. 5 is a horizontal section taken approximately on the line 5—5 of FIG. 3;

FIG. 6 is explanatory of a modification having a greater number of restrictor tubes, and is taken as though on the line 6—6 of FIG. 3;

FIG. 7 is a fragmentary vertical section corresponding to the right hand portion of FIG. 3 but drawn to enlarged scale.

Figure 8:
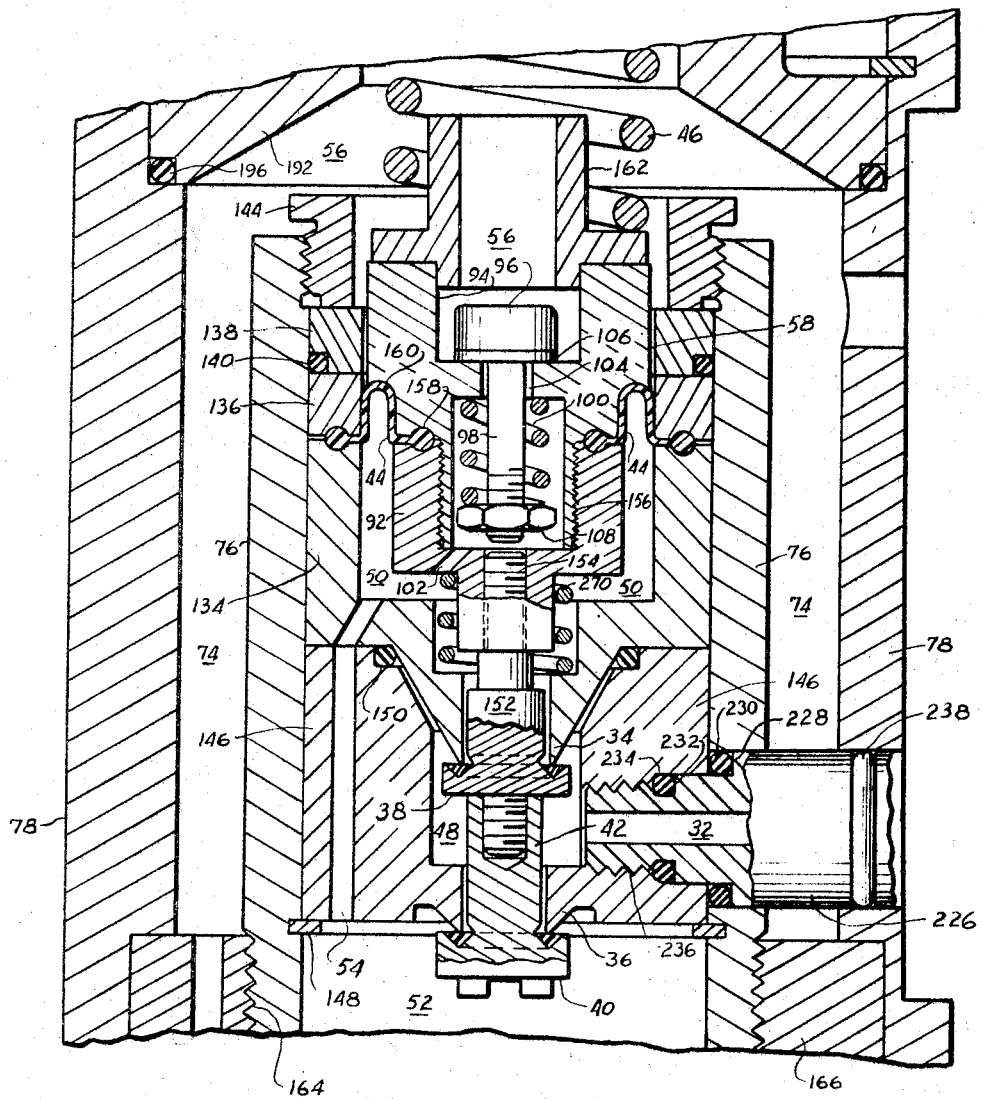
FIG. 8 is a vertical section corresponding to the middle portion of FIG. 3, but drawn to enlarged scale.

Referring to the drawing and more particularly to FIGS. 1 and 2, the flow control comprises a stationary body 12 which is generally cylindrical, but which is provided with a flat 14 on one side to which is welded a rectangular mounting block 16. The block 16 (FIG. 2) has an inlet 18 and an outlet 20. There is a third opening at 22 which is usually plugged by means of a threaded pipe plug, but to which a pressure gauge may be connected after removal of the plug. Such a gauge may be used as a measure of flow rate, but is not essential. A selector knob 24 at the bottom may be rotated to select a desired number of collateral restrictor tubes, and normally is locked in position. There is a main adjusting knob 26 at the top, preferably provided with scales 28 and 30, for adjusting the rate of flow through the selected restrictor tubes.

Referring now to FIGS. 3 and 8, the inlet 18 leads through a passage 32 to the valves of the regulator. The latter comprise two axially spaced valve seats 34 (FIG. 8) and 36 which face downwardly, but the flow control unit may be mounted in different positions. A valve 38 works against the seat 34, and another valve 40 works against the seat 36. The valves 38 and 40 have a common valve stem 42 and move in unison. There is a main flexible diaphragm 44 which is connected to the valve stem 42, and a main compression spring 46 which urges the valves in opening direction. The inlet passage 32 is connected to the region 48 between the two valves 38 and 40.

A reduced or intermediate pressure region 50 is in flow communication with the discharge side of the upper seat 34, and an intermediate pressure region 52 is in flow communication with the discharge side of the lower seat 36. These intermediate pressure regions are connected by a vertical passage 54, and may be considered to be a single region which is in flow communication with the discharge sides of both valves. The region 50 extends to the lower side of the diaphragm 44 and tends to close the valves. The upper side of the diaphragm is exposed to a lower pressure region 56, which usually is at the outlet pressure as is explained later.

The connection to region 56 is through an annular passage 58, but it will be understood that the effective area exposed to the low pressure of region 56 includes the metal parts across the entire diameter, much as though applied to a piston, with the diaphragm 44 serving merely to seal the piston against leakage. In similar fashion the intermediate pressure of region 50 is applied to the underside of the metal parts within the annular diaphragm 44, and not merely to the diaphragm itself.

If desired a small spring 270 may be disposed around the valve stem to ensure closing of the valves, should someone open the top of the unit, by mistake or for service.

Referring to FIG. 3, an open-ended restrictor tube 60 receives the reduced fluid pressure from region 52, and delivers it to the low pressure region 56. More specifically, a hollow stem 62 extends downward and has four radial passages 64 leading to a header region 66, from which the fluid flows upwardly through a hole in header 68 to the restrictor tube 60. The restrictor discharges into a low pressure region 70 connected by a passage 72 to an annular space 74 between an inner cylindrical housing 76 and an outer cylindrical housing 78. The top region 56 previously referred to is a continuation of the annular space 74. The difference in pressure between the intermediate pressure regions 50 and 52 and the low pressure region 56 is caused by the restrictor tube 60, and it is this differential in pressure that is applied to the main diaphragm 44. Whenever the intermediate pressure in region 50 falls below a desired value the compression spring 46 opens the valve until the intermediate pressure builds up to desired value, the force of which against the main diaphragm overcomes the action of the compression spring 46 and so closes the valve.

Instead of one restrictor tube 60 we provide a cluster of restrictor tubes, one or more of which may be selected for use depending on the flow rate required. Referring to FIG. 5 as well as FIG. 3, restrictor tubes 60 all terminate at their lower end in a flat header 68, and a valve 80 is slidable on the header 68, it being moved by means of the control knob 24 previously referred to. More specifically, the tubes 60 are preferably disposed on a semicircular arc, and the header 68 is circular. The valve 80 is approximately semi-circular in area, and is rotated by its extension or shank 82, on the lower end of which the knob 24 is secured, as by means of a set screw 84.

The position of the rotatable selector valve 80 may be locked by means of a lock screw 86. Referring to FIG. 4 knob 24 has an arcuate slot 88 through which the lock screw 86 passes. The slot 88 affords rotation of the knob when screw 86 is loosened, and after selection of a desired number of restrictor tubes the screw 86 again is tightened. In FIG. 3 the valve 80 is shown faced with a layer of synthetic rubber or other suitable sealing material 90. The lower ends of the exposed restrictor tubes are open to the intermediate pressure in header region 66, and the upper or discharge ends of the restrictor tubes are open to the low pressure region 70, and thence through annular space 74 to the low pressure region 56. One or two restrictor tubes may be coiled for greater length for minimum flow, and such a coil may be located in the vacant space in the housing 172, indicated in FIG. 3 by the long coil 61 and the shorter coil 63.

Referring to FIG. 4, the bottom knob 24 may be provided with a scale 23 cooperating with a fixed mark or pointer 25, and serving to indicate the number of restrictor tubes opened for use. In the illustrated position the knob has been turned about half way, and about half the tubes are in use, as is shown also in FIG. 5.

The diaphragm 44 is preferably protected against excessive pressure by means of a safety valve. Referring to FIG. 8 the diaphragm is annual and its beaded inner edge is clamped between parts 92 and 94. The latter carries safety valve 96, the stem 98 of which is urged downward to close the valve 96 by means of a compression spring 100. A diagonal drilled passage 102 admits the intermediate pressure to the region of spring 100, and thence to the lower face of valve 96 through an annular clearance space 104 surounding the stem 98. The bottom of valve 96 may be faced with synthetic rubber or other suitable gasket material, indicated at 106. The force of spring 100 may be adjusted by means of a nut 108.

In effect the inner edge of diaphragm 44 is held in a movable member 94, and the center of member 94 carries a safety valve 96 which is normally closed by spring 100. This keeps the valve closed up to a pressure which is considered safe for the diaphragm. The discharge side of the safety valve 96 is in communication with the low pressure region 56. Under excessive pressure the safety valve 96 opens to bypass the diaphragm.

A further feature of the flow control here illustrated is the provision of a back pressure valve to maintain a desired outlet pressure. Referring to FIG. 3, the back pressure valve is located in the rectangular mounting block 16, and is effectively connected between the low pressure region 56 which is also the discharge end of the restrictors 60, and the outlet 20 of the flow control unit. When the back pressure valve is open the region 56 is connected to the outlet 20, and when the back pressure valve is closed the region 56 is sealed from the outlet 20.

The parts are shown to larger scale in FIG. 7, referring to which a valve member 110 and its upwardly movable diaphragm 112 cooperate with a stationary valve seat 114. The valve is normally opened by means of a pusher 116 urged downward by a compression spring 118 the force of which may be adjusted by means of top seat 120 which is formed on the lower end of an adjusting screw 122, the upper end of which has a screw slot 124 to afford external adjustment. The low pressure region is connected through a radial hole 126 to the chamber of spring 118, and thence downward through an annular clearance 128 surrounding the pusher 116. The enlarged lower end of the adjusting screw 122 is sealed by means of an O ring 121.

The movable valve member 110 is located between the upper diaphragm 112 and a lower diaphragm 132. The main inlet or high pressure connection 18 has a side hole 134 leading upward to the diaphragm 132, thus tending to raise member 110 and diaphragm 112 to close the back pressure valve. The valve is opened by a combination of spring 118 and the outlet pressure or back pressure exerted on the top face of diaphragm 112. If the outlet pressure falls below a desired minimum the back pressure valve closes, thereby maintaining a desired back pressure in the low pressure region 56 (FIG. 3) of the flow control unit, regardless of any lower pressure existing in the outlet 20 and in the actuator or other device to which it may be connected. If the inlet pressure at 18 falls or is cut off, the back pressure valve opens to the outlet 20.

To summarize, the back pressure valve of FIG. 7 is connected between the discharge end of the restrictor (region 56) and the outlet 20, and the said valve is closable by a diaphragm (or more specifically in this particular case by the two connected diaphragm 112 and 132), one face of which is in communication with the high pressure inlet 18, and tends to cut off connection to the outlet 20 whenever the pressure at the outlet 20 falls below a desired level, the valve being openable by means of spring 118 adjustable by means of screw 122.

The preferred structure here illustarted may be described in greater detail as follows:

The balanced valve parts are carried in a cylindrical inner housing 76 (FIGS. 3 and 8). The upper valve seat 34 is formed at the lower end of a somewhat cup shaped member 134 the upper end of which acts as a bottom clamp for the beaded peripheral edge of the diaphragm 44. A clamp ring 136 is applied above the outer edge of diaphragm 44 and this is supplemented by a spacer ring 138 sealed by an O ring 140. These parts are held in position axially in the inner housing 76 by means of a tube nut 144.

The lower seat 36 is formed at the bottom of a somewhat cup shaped member 146 which is received in the lower end of the inner housing 76. It is held in position by a snap ring 148. An O ring 150 seals the high pressure region 48 from the intermediate pressure region 50 and the O ring 140 helps seal the intermediate pressure region 50 from the low pressure region 56.

Lower valve 40 is formed integrally at the lower end of an internally threaded valve stem portion 42. Upper valve 38 is formed integrally on a valve stem continuation 152, and a threaded stud projects downward from valve 38 and is screwed into stem 42, so that in effect both valves are on the same valve stem. Both valves are preferably coated with synthetic rubber as shown. The upper end of stem 152 is threadedly received at 154 in a somewhat cup shaped part 92 previously referred to, and the upper end of which acts as a lower clamp for the inner edge of the diaphragm 42. This part 92 is internally threaded to receive a tubular, externally threaded downward extension 156 formed at the lower end of a somewhat piston-like member 94. The latter has a part 158 which acts as a clamp for the top of the inner edge of the diaphragm, and an additional part 160 which serves as a support for the diaphragm. The part 94 acts somewhat like a piston which is sealed by the diaphragm, and which is connected to and forms an effective part of the valve stem of the balanced valves 38 and 40.

The downward pressure of the main spring 46 is applied to a bottom spring seat 162 which bears against the upper end of the member 94, and so urges the diaphragm and valves downward. The member 94 also carries the safety valve 96, as was previously explained.

The lower end of the inner housing 76 is threadedly received at 164 in a circular partition or closure member 166 which extends outward to the cylindrical outer housing 78. Reverting now to FIG. 3, the partition 166 is sealed by means of an O ring 168, and is held in position by the upper collar 170 of a cup shaped restrictor housing 172. The latter is held in position by a snap ring 174 beneath the collar 170. The passage 72 previously mentioned is simply a drilled hole through the partition 166, and more than one such hole may be provided if desired.

The header 68 of the restrictor tubes 60 may be formed integrally with an open-ended tubular stem 62. The upper end of the stem is received in the closure 166 and is held against upward movement by means of a snap ring 176. An O ring 178 seals the intermediate pressure region 48 from the low pressure region 70. The intermediate pressure region 52 is additionally sealed from the low pressure region by means of an O ring 272, held in position with the aid of a flat disc 274.

The periphery of header 68 is channeled and carries an O ring 180 which seals the intermediate pressure region 66 from the low pressure region 70. The orientation of the header 68 is fixed, as by means of a locating pin 182.

The rotary selector or sector valve 80 has a hub 184 which is received in the header 68, with an O ring 186 therebetween. The sector valve 80 is formed integrally with its spindle 82, and the latter carries an O ring 188 which seals the region 66 from the atmosphere. The lower end of the hub portion 184 of the sector valve forms a shoulder or collar which bears against the bottom of the restrictor housing 172, and so holds the header 68 and its stem 62 against downward movement. These parts are anchored between the upper snap ring 176 on the one hand, and the bottom of housing 172 on the other, and the latter is held by its own snap ring 174.

Returning to the upper part of the structure, the main spring 46 is housed in an externally threaded top 190, the outwardly flared lower end 192 of which is received in the outer housing 78, and is anchored in position by a snap ring 194. An O ring 196 seals the chamber 56.

The upper end of spring 46 carries a spring seat 198 the axial position of which may be adjusted by means of the main regulating knob 26, the latter being internally threaded to mate with the threaded top 190. Although not essential, the parts may be so dimensioned that the lower edge portion 200 of knob 12 is rotatably and slidably received and protected within the top edge portion 202 of the outer housing 78.

The motion of knob 12 is carried by a knob-pin 204 through the top 190 to the spring seat 198. An O ring 206 seals the knob pin 204 and is held in place by a retainer or bushing 208 which is forced into place. The outside of knob 12 is preferably knurled as shown at 210 in FIG. 2, and rotation of the knob adjusts the metered flow rate because it adjusts the pressure at the inlet side of the restrictor tubes, and so varies the rate of flow through the tubes. A scale may be provided as in indicated in FIG. 2, this comprising a vertical or helical scale 28 corresponding to the number of threads or full rotations, and a peripheral scale 30 for measuring fractions of a rotation.

Provision is made for venting the flow control, and reverting to FIG. 3, for this purpose the knob pin 204 has an axial passage 216 extending therethrough. This passage is closed at the top by means of a small stopper screw 218. When the screw is released part way the lower or stopper portion of the screw rises above a horizontal passage 220 extending through a set screw 222 which extends radially through the knob 26. Screw 222 locks the pin 204 in the knob, and it also provides a horizontal vent passage which is closed when stopper screw 218 is turned down. The middle part of the screw 222 is shown in cross section to expose the passage 220. It is to facilitate venting that the flow control preferably is mounted vertically as shown, but otherwise the unit may be mounted as desired.

The mounting block 16 is permanently secured to a flat formed on one side of the outer housing 78, and is preferably welded thereto as is indicated at 224. The inlet 18 is carried through the concentric housings to the region between the balanced valves by means of a horizontal cylindrical infeed member 226. The inner portion of this member is drawn to enlarged scale in FIG. 8, where it will be seen that it is stepped at 228 to receive an O ring 230, and is again stepped at 232 to receive an O ring 234. It is screwed into the part 146 by means of a thread indicated at 236, and this serves also to compress the O rings 230 and 234. Another O ring 238 seals the member 226 in the outer housing 78.

Reverting to FIG. 3, the infeed member 226 is followed by a threaded lock 240 which is screwed through the inlet passage 18, and the inner edge of which bears against another O ring 242.

The top of mounting block 16 is closed by means of a stationary top screw 244 having a nut shaped head 246. The adjusting screw 122 for adjusting the back pressure level passes threadedly through the top screw 244.

Referring now to FIG. 7, the upper diaphragm 112 is held between clamp part 115 of seat member 114, acting as a top clamp, and a bottom clamp ring 248. The bottom diaphragm 132 is held between the clamp ring 248 acting as a top clamp, and a bottom clamp ring 250. The latter has an O ring 252. These parts are all received in the lower end of a vertical cylindrical well or housing drilled downwardly from the top of the rectangular mounting block 16. The rings 114, 248 and 250 are all held downward by the lower end or tubular portion 254 of the aforesaid top screw 244, the latter being screwed down tight by means of its flat sided or nut-like head 246. The lower end of the screw is sealed by means of an O ring 256. The tubular part 254 is an integral extension of the screw 244, and has radial holes 126 and 258 through the wall of the screw to provide communication from the low pressure region 56, to the plug 22 which may be removed to attach a pressure gauge, and also to the center region or spring chamber from which the metered fluid flows downward through annular passage 128 and thence radially through passage 130 to the main outlet 20.

Referring to FIG. 2, the threaded holes 260 are mounting holes by means of which the device may be attached in desired position to a machine with which it is being used.

As so far described the restrictor tubes are mounted on a single circular arc as shown in FIG. 5. If desired a greater number of restrictor tubes may be provided by using two arcuate rows instead of one, and this is indicated in FIG. 6 in which the circular header 262 has an outer arcuate row of restrictor tubes 264 and an inner row of arcuate restrictor tubes 266. It will also be understood that one of these rows, usually the outer row 264, may be substantially a semi-circle, and the inner row 266 may have only a few tubes located near one end. In such case rotation of the sector valve will expose one restrictor tube at a time starting at one end, but near the end of its motion when a more rapid increase in flow rate may be wanted, it begins to expose two restrictor tubes for the same amount of rotation, until finally all are exposed.

Reverting to FIG. 3, it will be understood that the region 74 is an annular cylindrical region between cylindrical inner and outer housings 76 and 78; that the passage 72 is a hole through a circular bottom partition 166; that the passage 54 in a hole through lower seat member 146 (see also FIG. 8); and that the passage 32 is a radial passage formed through a stepped cylindrical infeed member 226 which bridges the space between the inner and outer housings 76 and 78, and which is sealed thereto by an appropriate series of spaced O rings. Referring to FIG. 7, the passages 126 and 258 are radial passages through the cylindrical downward extension of screw 244; the vertical passage 134 is a hole which connects the bottom of the back pressure valve well or housing to the inlet 18; and the outlet 20 is connected at 130 to an annular passage 131 which, in turn, may be connected by one or more radial holes through the outer part 115 which carries the valve seat 114.

In one particular case a flow control like that shown, used with medium hydraulic oil, provides for metering from as little as 0.01 cubic inch per minute to as much as 1472 cubic inches per minute, which represents a ratio in flow rate of over 140,000 to one. The said unit has twenty restrictor tubes most of which are one and one-half inches long. The first tube and the second tube are helical coils, as suggested in FIG. 6, and are concentric and occupy the vacant space in the cylindrical restrictor housing 172 (FIG. 3). These tubes have an internal diameter of 0.022 inch, and the first is twenty inches long and the second is ten inches long. The third tube has an internal diameter of 0.030 inch, and this and all remaining tubes are straight and have a length of one and one-half inches. The fourth and succeeding tubes have an internal diameter of 0.046 inch.

The restrictor tubes may be varied, depending on the flow range wanted, and on the viscosity of the particular liquid being handled. In the illustrated example the restrictor housing 172 was long enough to accommodate restrictor tubes which were two and one-half inches long. The coiled extra length first and second tubes are needed if a very low minimum flow rate is wanted.

In FIG. 6, the header has a diameter of about 1½ inches, and carries eighteen restrictor tubes on the outer arc, and two additional restrictor tubes in radial alignment with the last or end two of those on the outer arc, making twenty tubes in all. The tubes are arcuately spaced 10° apart. In FIG. 5 there are eighteen tubes.

The main spring 46 is a 160 pound spring. The safety valve spring 100 is a six pound spring. The back pressure valve spring 118 is a twelve pound spring.

The diaphragms are preferably made of Buna N rubber strengthened with nylon flock. The O rings are preferably made of Buna N rubber. The balance valves and the rotatable selector valve (80 in FIG. 3) are surfaced with Buna N rubber. The small diaphragms of the back pressure valve are made of Buna N rubber with cotton flock. Other materials may be used, if not adversely affected by the particular fluid being handled.

It is believed that the construction and method of assembly of our improved balanced adjustable control for metered flow, as well as the advantages of the same will be apparent from the foregoing detailed description. It will also be apparent that while we have shown and described our invention in a preferred form, changes may be made without departing from the scope of the invention, as sought to be defined in the following claims.

In the claims the reference to collateral restrictor tubes is not intended to exclude a tube which is coiled or folded for greater length.

We claim:

1. An adjustable flow control for metering the flow of a fluid, said flow control comprising an adjustable pressure regulator and a restrictor, said regulator having two axially spaced valve seats facing in the same direction, two valves cooperating with said seats, a common valve stem carrying said valves, a diaphragm connected to said valve stem, a compression spring urging said valves in opening direction, an inlet leading to the region between said valves, one end of said restrictor being connected to the discharge side of said valves and to that side of the diaphragm which tends to close the valves, the other end of the restrictor being connected to an outlet and also to that side of the diaphragm which tends to open the valves, said restrictor having one or more restrictor tubes of large enough bore to avoid clogging and long enough for a very low rate of flow, means to adjust the force of the compression spring in order to adjust the metered rate of flow of the fluid through the outlet, the restrictor comprising a cluster of collateral restrictor tubes all terminating at one end in a flat header, a valve slidable on said header, and a control means for moving said valve and thereby opening and making effective certain restrictor tubes and blocking and making ineffective the remaining restrictor tubes.

2. Apparatus as defined in claim 1, in which the header is circular, and in which the valve is a rotatable sector valve, and in which the control means is an externally accessible control knob.

3. Apparatus as defined in claim 2, in which the diaphragm is annular, and in which the inner edge of the diaphragm is held in a movable member, and in which said member carries a safety valve normally closed by a spring, said spring serving to keep the valve closed up to a desired level of pressure considered safe for the diaphragm, whereby under excessive pressure which might injure the diaphragm the safety valve opens to bypass the diaphragm.

4. Apparatus as defined in claim 2, in which there is a back pressure valve for maintaining a desired level of back pressure in the regulator, said back pressure valve being connected between the discharge end of the restrictor and the outlet of the flow control, said valve being normally opened by an adjustable spring, and being closable by a diaphragm one face of which is in flow communication with the high pressure inlet to the flow control, and thereby tending to cut off connection to the outlet whenever the outlet pressure falls below the desired level.

5. Apparatus as defined in claim 1, in which the restrictor comprises a cluster of collateral restrictor tubes disposed on a semi-circular arc and terminating at one end in a flat circular header, a rotatable sector valve rotatably slidable on said header, said valve being approximately semi-circular in area, and a control knob for rotating said sector valve and thereby opening and making effective certain restrictor tubes and blocking and making ineffective the remaining restrictor tubes.

6. Apparatus as defined in claim 5, in which the diaphragm is annular, and in which the inner edge of the diaphragm is held in a movable member, and in which said member carries a safety valve normally closed by a spring, said spring serving to keep the valve closed up to a desired level of pressure considered safe for the diaphragm, whereby under excessive pressure which might injure the diaphragm the safety valve opens to bypass the diaphragm.

7. Apparatus as defined in claim 5, in which there is a back pressure valve for maintaining a desired level of back pressure in the regulator, said back pressure valve being connected between the discharge end of the restrictor and the outlet of the flow control, said valve being normally opened by an adjustable spring, and being closable by a diaphragm one face of which is in flow communication with the high pressure inlet to the flow control, and thereby tending to cut off connection to the outlet whenever the outlet pressure falls below the desired level.

8. An adjustable flow control as defined in claim 1 in which the valves and valve seats and diaphragm are disposed in a generally cylindrical housing, and in which the compression spring is housed in an upward extension of said housing having an adjusting knob at the top for adjusting the spring, and in which there are collateral restrictor tubes terminating at their lower end in a flat circular header which is at the lower end of an open-ended tubular stem, said assembly of stem and header and tubes being carried in a downward extension of said housing, a rotatable sector valve slidable on the lower face of said header, and a control knob beneath the lower end of the housing for rotating said sector valve and thereby opening and making effective a desired number of said restrictor tubes.

9. An adjustable flow control for metering the flow of a fluid, said flow control comprising an adjustable pressure regulator, and a restrictor, said regulator having a manually operable means to adjust the same over a desired pressure range, and said restrictor being a cluster of collateral restrictor tubes all terminating at one end in a flat header, each of said restrictor tubes having a large enough bore to avoid clogging and being long enough for a very low rate of flow, a valve slidable on said header, an externally accessible control means for moving said valve and thereby opening and making effective certain restrictor tubes and blocking and making ineffective the remaining restrictor tubes, means to lock the adjustment of said control means, said regulator being operated by a diaphragm which is annular, the inner edge of the diaphragm being held in a movable member, said member carrying a safety valve normally closed by a spring, said spring serving to keep the valve closed up to a desired level of pressure considered safe for the diaphragm, whereby under excessive pressure which might injure the diaphragm the safety valve opens to bypass the diaphragm.

10. An adjustable flow control for metering the flow of a fluid, said flow control comprising an adjustable pressure regulator, and a restrictor, said regulator having a manually operable means to adjust the same over a desired pressure range, and said restrictor being a cluster of collateral restrictor tubes all terminating at one end in a flat header, each of said restrictor tubes having a large enough bore to avoid clogging and being long enough for a very low rate of flow, a valve slidable on said header, an externally accessible control means for moving said valve and thereby opening and making effective certain restrictor tubes and blocking and making ineffective the remaining restrictor tubes, means to lock the adjustment of said control means, a back pressure valve for maintaining a desired level of back pressure in the regulator, said back pressure valve being connected between the discharge end of the restrictor and the outlet of the flow control, said valve being normally opened by an adjustable spring, and being closable by a diaphragm one face of which is in flow communication with the high pressure inlet to the flow control, and thereby tending to cut off connection to the outlet whenever the outlet pressure falls below the desired level.

References Cited

UNITED STATES PATENTS

| | | | |
|---|---|---|---|
| 2,345,997 | 4/1944 | Anderson | 251—112 X |
| 1,079,600 | 11/1913 | Kennedy | 137—505.42 |
| 1,432,900 | 10/1922 | Quiroga | 251—121 |
| 1,787,686 | 1/1931 | Kerr | 137—501 |
| 2,608,209 | 8/1952 | Bryant | 137—501 |
| 2,824,573 | 2/1958 | Mason et al. | 251—126 X |
| 2,887,123 | 5/1959 | Becker | 137—505.11 |
| 3,335,748 | 8/1967 | Klemm et al. | 137—501 |

FOREIGN PATENTS 28,198   1884   Germany.

ALAN COHAN, *Primary Examiner.*

D. H. LAMBERT, *Assistant Examiner.*

U.S. Cl. X.R.

137—613; 138—46; 251—121